(12) United States Patent
Dombroski et al.

(10) Patent No.: US 8,001,112 B2
(45) Date of Patent: Aug. 16, 2011

(54) USING MULTIDIMENSIONAL ACCESS AS SURROGATE FOR RUN-TIME HASH TABLE

(75) Inventors: Matthew Dombroski, Lancaster, MA (US); Ekrem Soylemez, Arlington, MA (US); Andrew Witkowski, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1055 days.

(21) Appl. No.: 10/898,304

(22) Filed: Jul. 23, 2004

(65) Prior Publication Data

US 2004/0260690 A1    Dec. 23, 2004

Related U.S. Application Data

(63) Continuation-in-part of application No. 10/424,003, filed on Apr. 25, 2003.

(60) Provisional application No. 60/379,870, filed on May 10, 2002.

(51) Int. Cl.
*G06F 7/00* (2006.01)

(52) U.S. Cl. .................................. 707/718; 707/760

(58) Field of Classification Search ........... 707/1–104.1, 707/718, 756, 760
See application file for complete search history.

(56) References Cited

U.S. PATENT DOCUMENTS

| | | | |
|---|---|---|---|
| 5,367,675 A | 11/1994 | Cheng et al. | |
| 5,799,300 A * | 8/1998 | Agrawal et al. | 707/5 |
| 5,907,848 A | 5/1999 | Zaiken et al. | |
| 5,918,232 A * | 6/1999 | Pouschine et al. | 707/103 R |
| 5,987,467 A | 11/1999 | Ross et al. | |
| 6,163,774 A | 12/2000 | Lore et al. | |
| 6,173,292 B1 | 1/2001 | Barber et al. | |
| 6,205,447 B1 | 3/2001 | Malloy | |
| 6,385,604 B1 | 5/2002 | Bakalash et al. | |
| 6,421,665 B1 * | 7/2002 | Brye et al. | 707/3 |
| 6,438,537 B1 | 8/2002 | Netz et al. | |
| 6,493,699 B2 | 12/2002 | Colby et al. | |
| 6,553,366 B1 * | 4/2003 | Miller et al. | 707/2 |
| 6,560,594 B2 | 5/2003 | Cochrane et al. | |
| 6,567,928 B1 | 5/2003 | Lyle et al. | |
| 6,587,857 B1 | 7/2003 | Carothers et al. | |
| 6,615,203 B1 | 9/2003 | Lin et al. | |
| 6,618,822 B1 | 9/2003 | Loaiza et al. | |
| 6,629,102 B1 * | 9/2003 | Malloy et al. | 707/102 |
| 6,651,073 B1 | 11/2003 | Lyle et al. | |

(Continued)

OTHER PUBLICATIONS

Ramsak, Frank, "Interactive ROLAP on Large Datasets: A Case Study with UB-Trees," Database Engineering & Applications, Jul. 16-18 2001, pp. 167-176.

(Continued)

*Primary Examiner* — James Trujillo
*Assistant Examiner* — Linh Black
(74) *Attorney, Agent, or Firm* — Hickman Palermo Truong & Becker LLP (57) ABSTRACT

Approaches are disclosed for using a multidimensional database as a surrogate for a run-time hash table in the context of processing a relational query. In an embodiment, an analytic workspace is used to store data, wherein the data is to be evaluated using a by a function in the processing of a MODEL clause. The approaches eliminate the need to use a hash table to store the data that is to be evaluated. The data may initially reside in the analytic workspace, or it may be loaded into the analytic workspace.

19 Claims, 4 Drawing Sheets

U.S. PATENT DOCUMENTS

| | | | |
|---|---|---|---|
| 6,665,682 B1* | 12/2003 | DeKimpe et al. | 707/101 |
| 6,691,301 B2* | 2/2004 | Bowen | 717/114 |
| 6,826,556 B1* | 11/2004 | Miller et al. | 707/2 |
| 6,931,418 B1* | 8/2005 | Barnes | 707/103 R |
| 6,980,980 B1 | 12/2005 | Yeh | |
| 7,020,647 B1 | 3/2006 | Egan et al. | |
| 7,194,465 B1* | 3/2007 | MacGregor | 707/6 |
| 7,222,130 B1 | 5/2007 | Cras et al. | |
| 2002/0059195 A1* | 5/2002 | Cras et al. | 707/3 |
| 2002/0087516 A1* | 7/2002 | Cras et al. | 707/2 |
| 2002/0091681 A1* | 7/2002 | Cras et al. | 707/3 |
| 2002/0091707 A1* | 7/2002 | Keller | 707/104.1 |
| 2002/0103807 A1* | 8/2002 | Yamashita | 707/101 |
| 2002/0126545 A1 | 9/2002 | Warren et al. | |
| 2002/0138353 A1 | 9/2002 | Schreiber et al. | |
| 2002/0168621 A1 | 11/2002 | Cook et al. | |
| 2002/0184187 A1* | 12/2002 | Bakalash et al. | 707/1 |
| 2002/0188598 A1 | 12/2002 | Myllymaki | |
| 2003/0009295 A1* | 1/2003 | Markowitz et al. | 702/20 |
| 2003/0014417 A1* | 1/2003 | Kelkar | 707/100 |
| 2003/0084053 A1* | 5/2003 | Govrin et al. | 707/100 |
| 2003/0088540 A1* | 5/2003 | Edmunds et al. | 707/1 |
| 2003/0093424 A1* | 5/2003 | Chun et al. | 707/7 |
| 2003/0101202 A1* | 5/2003 | Kelkar et al. | 707/201 |

OTHER PUBLICATIONS

Ross, Kenneth A., "Serving Datacube Tuples from Main Memory," Scientific and Statistical Database Management, Jul. 26-28, 2000, pp. 182-195.

* cited by examiner

USING MULTIDIMENSIONAL ACCESS AS SURROGATE FOR RUN-TIME HASH TABLE

CROSS REFERENCE TO RELATED APPLICATIONS

This application is a continuation-in-part of and claims the benefit of domestic priority from:

U.S. patent application Ser. No. 10/424,003 entitled "Methods of Navigating a Cube that is Implemented as a Relational Object," filed on Apr. 25, 2003, which claims the benefit of priority from U.S. Provisional Application No. 60/379,870, entitled "Online Analytical Processing (OLAP) Operations and Access Structures for Data Stored in a Relational Database," filed on May 10, 2002;

U.S. patent application Ser. No. 10/423,356 entitled "Using Relational Structures to Create and Support a Cube Within a Relational Database System," filed on Apr. 25, 2003, which also claims the benefit of priority from U.S. Provisional Application Ser. No. 60/379,870, entitled "Online Analytical Processing (OLAP) Operations and Access Structures for Data Stored in a Relational Database," filed on May 10, 2002; and U.S. patent application Ser. No. 10/417,732 entitled "Techniques for Managing What-If Analysis of Data Managed by a Relational Database System," filed on Apr. 16, 2003; which claims the benefit of priority from U.S. Provisional Application Ser. No. 60/375,726, entitled "Integrating Online Analytical processing (OLAP) functions Into A Relational Database Management System (RDMBS)," filed on Apr. 26, 2002.

This application is related to U.S. patent application Ser. No. 10/898,280 entitled "Using a Cache to Provide Cursor Isolation," by Matthew Dombroski and Ekrem Soylemez, filed on Jul. 23, 2004.

The contents of all of which are incorporated by reference in their entirety for all purposes, as if fully set forth herein.

FIELD OF INVENTION

The invention generally relates to computer systems, and, more specifically, relates to approaches for using a multidimensional database as a surrogate for a run-time hash table in the context of processing a relational query.

BACKGROUND OF THE INVENTION

The approaches described in this section are approaches that could be pursued, but not necessarily approaches that have been previously conceived or pursued. Therefore, unless otherwise indicated, the approaches described in this section are not prior art to the claims in this application and are not admitted to be prior art, merely by inclusion in this section.

Historically, there has been a distinction between relational database management systems (RDBMS) and multidimensional database management systems (MDDBMS). Each type of system has evolved somewhat independently from the other and to meet different goals. There are many general differences between such systems, including (1) database schema, (2) processes used to store, access and retrieve such data, and (3) data analysis capabilities, to name a few. Many specific differences in the internal processes associated with relational and multidimensional database systems stem from these general differences.

One significant difference between relational and multidimensional database systems is the difference in their respective transaction models and operation of associated transaction engines. Generally, relational systems and processes are modeled to provide fast and efficient loading and revising of data, whereas multidimensional systems and processes are modeled to provide fast, complex real-time analytical processing of data. Furthermore, relational systems are modeled to support many short transactions, or sequences of operations, that are almost always committed. That is, the changes made by transactions executed in a relational database system are almost always made permanent to the database.

In contrast, multidimensional systems are modeled to support long transactions that frequently are not committed. This is, the changes made by transactions executed in multidimensional system are usually temporary, only visible to the transaction that is making the changes, and must be removed from the database after the transaction terminates.

Not only do relational and multidimensional database systems meet different needs, in addition, such systems have historically been configured as separate stand-alone systems. In some instances, such systems are configured to emulate the functionality of one type of system in the other type of system. For example, U.S. Pat. No. 6,484,179 describes techniques for organizing multidimensional data in a relational database system in a manner that improves the performance of OLAP operations within the relational database system.

However, in prior approaches, the two disparate systems are not truly integrated. Prior approaches do not provide efficient large-scale analytical processing of transactions on relationally stored data, while maintaining desired properties of such data. For example, prior approaches do not provide the ability to efficiently handle multi-session what-if analysis transactions (e.g., MOLAP transactions) on relationally managed data, while maintaining the ACID (atomicity, consistency, isolation, durability) transaction properties typically associated with relationally managed data. What-if analyses are popular scenarios in data warehouse environments, particularly for assimilation of data in a business decision-making context. A data warehouse is a consolidated view of enterprise data, optimized for reporting and analysis. Basically, a data warehouse is an aggregated, sometimes summarized copy of transaction and non-transaction data specifically structured for dynamic querying, analysis and reporting.

A MODEL clause in a structured query language ("SQL") provides numerous beneficial features, and is particularly useful in the context of integrated relational and multidimensional data. Techniques related to the MODEL clause are described in detail U.S. patent application Ser. No. 09/886,839, entitled "PERFORMING SPREADSHEET-LIKE CALCULATIONS IN A DATABASE SYSTEM", filed on Jun. 20, 2001, the entire contents of which are incorporated herein.

A MODEL clause allows database developers to treat relational data as multidimensional arrays. The data that is acted on by a MODEL clause may be referred to a "model data". Formulas can then be defined on the arrays. As a result of the foregoing structure, a MODEL clause may resolve formula dependencies automatically, therefore supporting large sets of interlinked formulas in sophisticated applications. In particular, a MODEL clause is useful in the processing of complex calculations that involve inter-row references. The following example of a MODEL clause predicts sales of 'bike' in 2000 to be sum of its sales in 1999 and 1998 and sales of car in 2000 to be an average of years 1990 through 1994:

```
MODEL PARTITION BY (country) DIMENSION BY (prod, year)
MEASURES (sales)
(
   sales['bike', 2000] = sales['bike', 1999] + sales['bike', 1998],
   sales['car', 2000] = avg(sales)['car', for year in (1990,1991,1992,
   993,1994)]
)
```

Prior to the advent of the MODEL clause, such complex calculations often demanded the use of multiple data transformations, such as join and union statements, which are cumbersome and painstaking to develop.

In order to perform a relational query with a MODEL clause, random access of the data in the OLAP table is required. However, the data in the OLAP table cannot be randomly accessed. One solution is to create a hash table at runtime, and populate the hash table with OLAP table data. Once the data is stored in the hash table, it may be randomly accessed. A relational engine then evaluates the data in the hash table by applying spreadsheet functions. Spreadsheet functions include functions in which calculations, such as summation and averaging, are performed on data residing in rows, columns and/or other dimensions of a database.

However, various costs are associated with the creation of the hash table "on the fly" at run time. Additionally, some aspects of the hash table performance are undesirable. In particular, the creation of the hash table at run time is a resource intensive operation that consumes a great deal of time, memory and disk space. Also, in the event that the source data to be stored in the hash table is in an analytic workspace, the time to retrieve the data, and to build and populate the hash table is even greater.

One solution for decreasing the time consumed in the creation of the hash table at run time is to increase the size parameters of the hash table. However, this solution is not optimal because a great deal of memory must be employed if the parameters of the hash table are increased. Additionally, as a result of over-allocation of memory for a hash table, over-fetching may occur, which is not desirable. Over-fetching occurs when an area of memory is retrieved, but only a portion of the area is actually needed.

Additionally, due to the structure of a hash table, there are certain inefficiencies in the accessing and retrieval of data from the hash table. These inefficiencies can be rectified to a certain extent by optimization procedures to be performed on the hash table. However, the optimization procedures are costly to apply, and painstaking to develop.

In the implementation of the MODEL clause, as well as in the context of implementing other SQL statements and clauses, it would be desirable to have a configuration or mechanism that avoids the costs associated with creating and using a hash table at run time.

BRIEF DESCRIPTION OF THE FIGURES

The disclosed subject matter is depicted by way of representative examples, and not by way of limitation, in the illustrations of the accompanying figures. The figures include.

DETAILED DESCRIPTION OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Approaches are disclosed for using a multidimensional database as a surrogate for a run-time hash table in the context of processing a relational query.

In one embodiment, an approach is disclosed that employs an analytic workspace to store the data that is subject to a relational query, wherein the data is to be evaluated using one or more functions, such as a MODEL function. Such data is referred to herein as "model data".

An analytic workspace is a storage type that provides multidimensional structures that are compatible with multidimensional database objects such as dimensions, variables, formulas, relations, and value sets. Analytic workspaces can persist across sessions and be shared by multiple user sessions. In the context of OLAP operations, an analytic workspace includes a set of data that is being manipulated according to the OLAP operations. The data underlying an analytic workspace may be stored persistently in relational database tables, as BLOBs (binary large object), for example. Furthermore, the data associated with an analytic workspace may comprise a portion of a multidimensional cube.

In other words, an analytic workspace is a construct that provides multidimensional structures that are compatible with multidimensional database objects such as dimensions, variables, formulas, relations, and value sets. Therefore, analytic workspace 150 includes a set of data on which extended or complex OLAP operations can be performed. In an embodiment, analytic workspaces are acquired from a database via procedures associated with an OLAP Application Programming Interface (API"). For example, a database user performing OLAP operations on a set of multidimensional data, such as through an OLAP API to analyze data in analytic workspace, may requests aggregated or otherwise processed and grouped measure data for various grouping combinations of geography/time dimensions.

The use of an analytical workspace to hold the model data eliminates the need to use a hash table to store the model data. In one embodiment, a relational engine is used to evaluate model functions that are included in queries that are performed on model data stored in an analytic workspace. The model data may initially reside in the analytic workspace, or it may be loaded into the analytic workspace in response to execution of the query that contains the model clause.

Each time a query that contains a model clause is executed, random access to the data upon which the clause in applied is required. As stated above, in the prior art, random access was provided by a hash table created for processing of the clause.

However, as explained above, the creation and use of the hash table has many disadvantages.

In contrast, in the techniques described hereafter, a multi-dimensional database, such as an analytic workspace, is used as a to provide random access to model data. In a sense, the analytic workspace may serve as a surrogate for the hash table used to hold model data in the prior art. This use an analytic workspace has many advantages. For example, a pre-existing and/or persistent analytic workspace can be used, which reduces or eliminates the need to create data structures, such as a hash table, "on the fly" when an query is executed. Therefore, the use of an analytic workspace reduces or eliminates the time and storage costs involved with creating a hash table. If the data is already in an analytic workspace at the time the query is executed, even more time is saved. If the data is not already in the analytic workspace when the query is executed, the data may be loaded into the analytic workspace.

In addition, an analytic workspace provides more efficient and faster random access than a hash table if the data is much larger than the memory allocated to the hash table. In this regard, the need to perform various optimization steps that are often performed on hash table data is reduced or eliminated in the disclosed approaches. A join or a predicate push down is an example of an optimization technique that can be avoided by implementing a disclosed approach.

Additionally, in the disclosed approaches, there is no need to over-allocate storage parameters, as is often done to allow a hash table to function more efficiently. The over-allocation of storage parameters lead to over-fetching, a problem that is also reduced or eliminated in an embodiment. Moreover, procedures to optimize the size of hash tables may be extremely complex. Due to these complexities, the hash table, in its ultimate form, may still not function efficiently, and a lot of time may be wasted to develop and apply methods of managing the memory footprint of the hash table with respect to the data set.

Exemplary System

Figure 1:
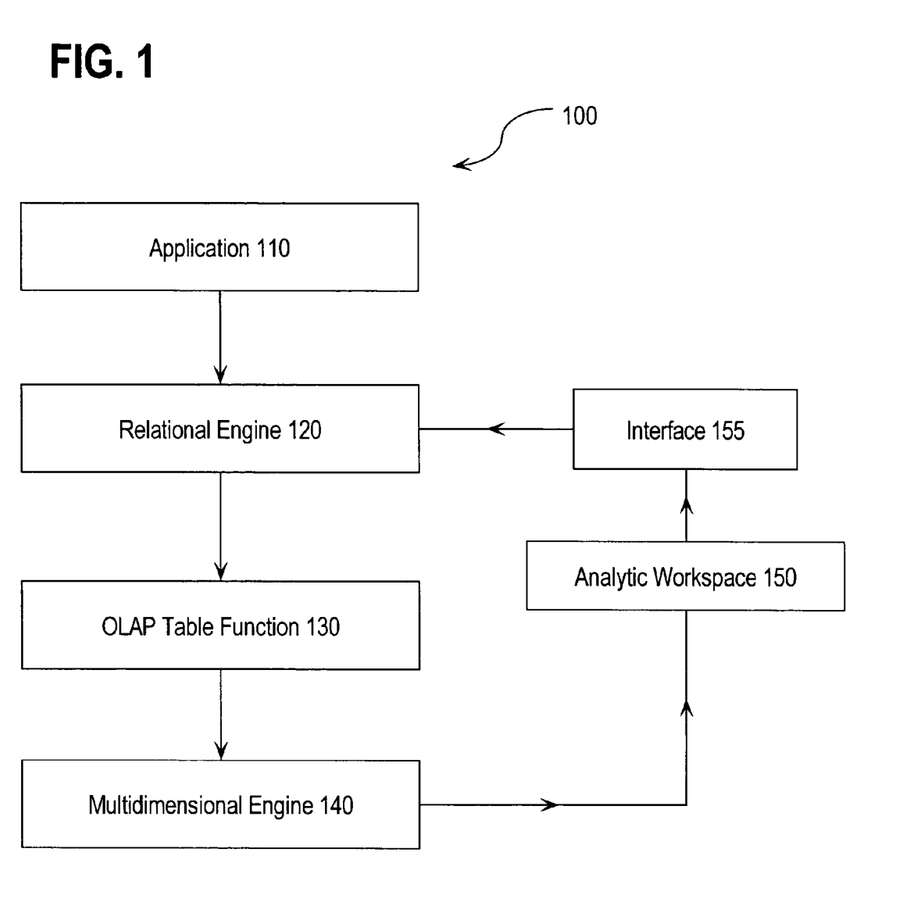
FIG. 1 is a block diagram depicting an embodiment of a system for processing a relational query using an analytic workspace.

FIG. 1 is a block diagram depicting an embodiment of a system for processing a relational query using an analytic workspace.

System 100 may be used to perform a relational query that includes a MODEL clause. The disclosed embodiments are particularly useful in respect of queries, such as those that involve a MODEL clause.

System 100 comprises analytic workspace 150, which serves as a surrogate for the hash table that was created in prior art approaches to handling queries that have model clauses. According to one embodiment, analytic workspace 150 exists prior to the time that the query that includes the model clause is performed, although it is not necessary that the data be loaded into analytic workspace 150 prior to the time that the query is performed. If the model data to be subject to the MODEL clause resides in a relational table, the data in the relational table may be loaded into analytic workspace 150. However, if the data already exists in analytic workspace 150 when the query that includes the model clause is executed, the query will be faster.

The MODEL clause may then be applied to the data in the analytic workspace 150. The data upon which a function is to be performed is specified in the list of a FROM clause of a query. In the prior art, when a query with a MODEL clause was executed, the hash table was created on the data generated by the query block. In an embodiment, instead of referring to the hash table in the FROM clause of the query, analytic workspace 150 may be referenced. For example, the following query may be executed:
SELECT TIME, PRODUCT, CUSTOMER, SALES
FROM AW_XYZ
MODEL DIMENSION BY (PRODUCT, CUSTOMER)
   MEASURES (SALES)

In this example, AW_XYZ is the name of the analytic workspace containing the model data. The use of analytic workspace 150 will allow more efficient and faster access of the data, in comparison to prior art methods which employed a hash table.

In an embodiment of system 100, relational engine 120 directly accesses the model data in analytic workspace 150. Because model data is directly accessed, the access to the data in analytic workspace 150 should not be "wrapped" in other functions, such as wrapped in a WINDOW function. The analytic workspace is presented as a materialized view of a table.

System 100 includes application 110. Application 110 submits a query that includes a MODEL clause. System 100 employs various engines and functions to redirect a query to a multidimensional engine. As a result, the architecture of system 100 ensures that any select statement can be run against multidimensional data types, and that the results are consistent with the same select statement against a relational table. This aspect is facilitated by lying relational engine 120 over multidimensional table 140.

In the prior art, after the steps of aggregation and calculation were performed in multidimensional engine 140, it was necessary to create a hash table and populate the hash table with data from multidimensional engine 140 to enable model functions to be evaluated by relational engine 120. However, as described above, analytic workspace 150 serves as a surrogate for the hash table, and stores data upon which functions, such as the MODEL clause, functions may be performed by relational engine 120.

In an embodiment, system 100 also includes interface 155. Because a hash table and an analytic workspace have different structures, the same interface cannot be used to access the data that resides therein. In the prior art, a standard interface is used to access model data in the hash table. However, in an embodiment disclosed herein, a second layer interface is added to the standard interface to allow calls made through the standard interface to access an analytic workspace, using typical analytical workspace methods.

The disclosed methods reduce the overhead involved with various data transformations that were required in the prior art. For example, in the prior art, random access data in an analytic workspace was transformed into serial access relational data, and was then transformed into random access data in the hash table. Such transformations are reduced or eliminated by a disclosed embodiment, in which random access to model data is provided directly to relational engine 120.

Figure 2:
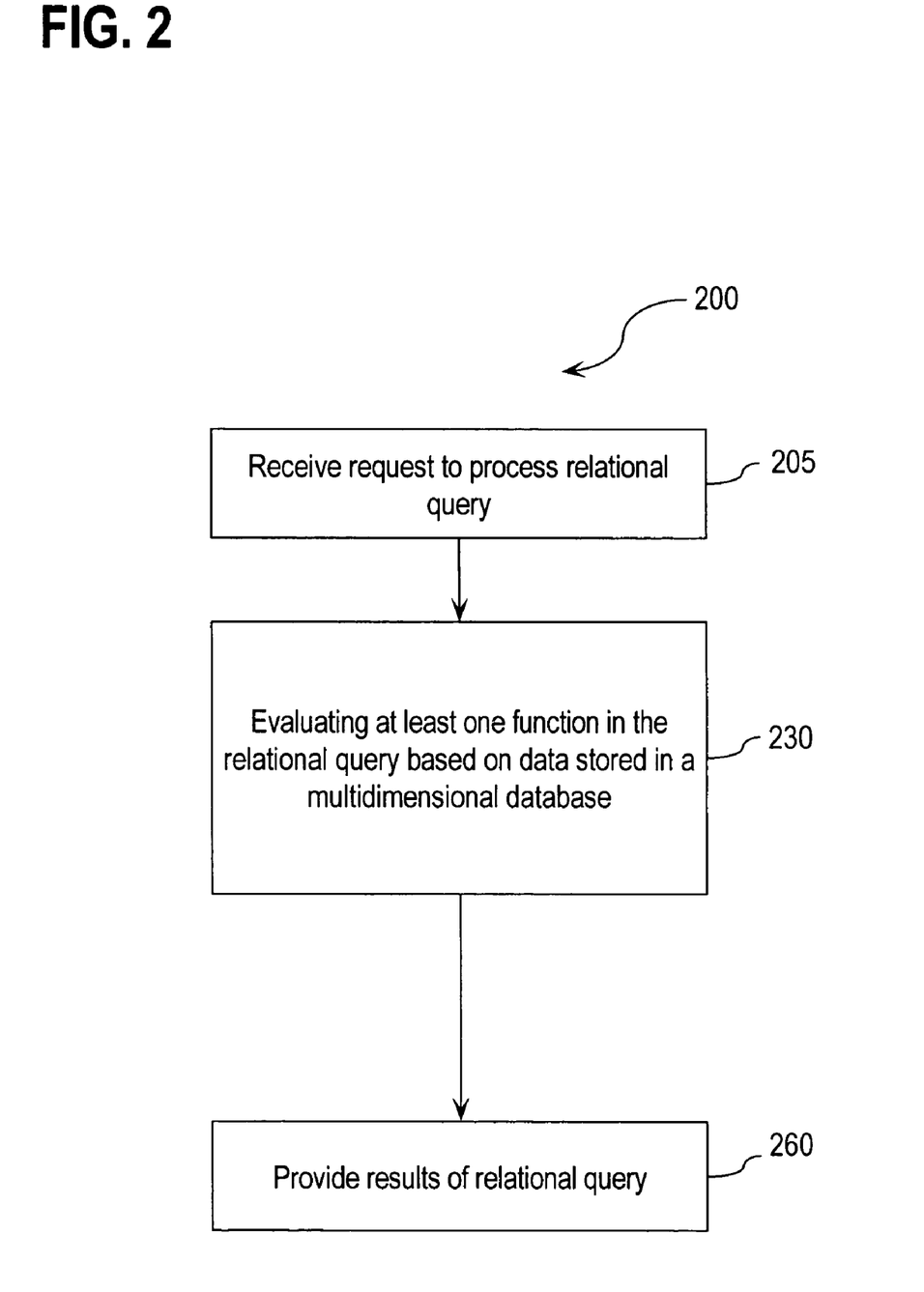
FIG. 2 is a flow chart depicting the embodiment of a method for processing a relational query using an analytic workspace.

FIG. 2 is a flow chart depicting an embodiment of method 200 for processing a relational query using an analytic workspace.

Step 205 comprises receiving a request to process a relational query in which data is updated. In one embodiment, the relational query may involve updating data through the application of a MODEL clause. The MODEL clause may be part of a SELECT statement, and is received by an application and processed by one or more engines, such as a relational engine. The disclosed subject matter may also be used in respect of other clauses which update data.

Step 230 comprises evaluating functions based on model data in an analytic workspace in order to process the relational query. In an embodiment, the functions include functions associated with the application of a MODEL clause. The application of functions may include the application of formulas on multidimensional arrays. The functions are comprised of computational rules expressed in terms of dimension variables.

Step 260 comprises providing the results of the relational query. The results of the relational query may be communicated to the application. In an embodiment, the results are returned to the application by a relational engine via Oracle Call Interface ("OCI") or Java Database Connectivity ("JDBC").

Embodiments of the disclosed subject matter may be applied in respect of other storage mediums. For example, an embodiment could be used to process queries that are performed on other types of random-access storage, not just analytic workspaces. Additionally, an embodiment could be applied in respect of the processing of SQL clauses other than the MODEL clause.

Figure 3:
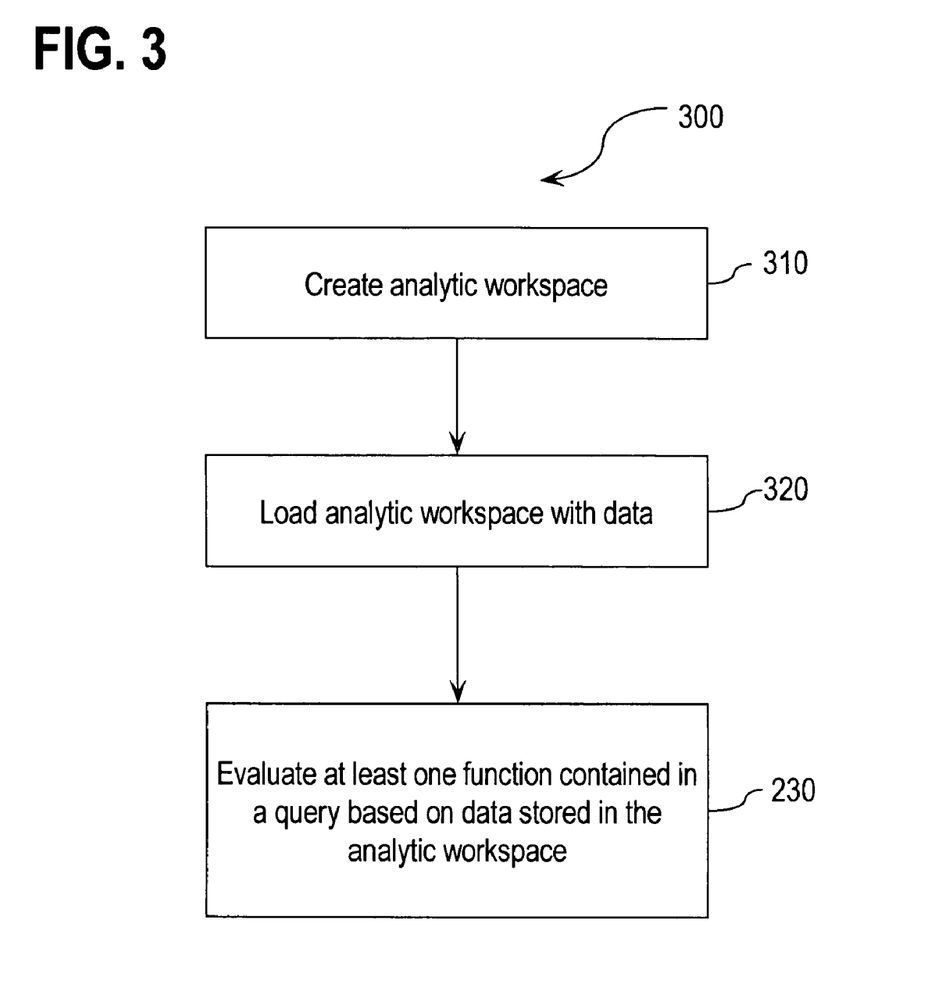
FIG. 3 is a flow chart depicting an embodiment of another method for processing a relational query using an analytic workspace.

FIG. 3 is a flowchart depicting the embodiment of method 300 for processing a relational query using an analytic workspace in a context in which the data upon which the relational query is to be performed resides in relational tables and has not yet been loaded into an analytic workspace.

In step 310, an analytic workspace is created. The analytic workspace may be created using conventional means for creating an analytic workspace. However, in other embodiments, the analytic workspace may be pre-existing, without data residing therein until it is populated with data, as described below.

Step 320 comprises populating the analytic workspace with data. Therefore, data that resides in relational tables can be dynamically populated into the analytic workspace. As a result, the more efficient data access methods described herein may be applied to process the relational query in respect of the data that is populated into the analytic workspace. In a sense, the analytic workspace provides a materialized view of the relational tables.

In step 230, similar to the steps of method 200, model functions are evaluated based on data that is loaded into the analytic workspace. In an embodiment, a relational engine may evaluate the model functions In the approaches described above, an analytic workspace provides a materialized view of relational tables. If such a materialized view is maintained, query references to multiple relational tables may be replaced with references to analytic workspaces.

```
SELECT SUBSTR(country,1,20) country, SUBSTR(prod,1,15)
prod, year, sales
FROM AW_XYZ
WHERE country='Italy'
MODEL PARTITION BY (country) DIMENSION BY (prod, year)
MEASURES (sales)
(
    sales['bike', 2000] = sales['bike', 1999]
+ sales['bike', 1998],
    sales['car', 2000] = avg(sales)['car', for year in
(1990,1991,1992,1993,1994)]
)
```

In the above example, model data in the analytic workspace AW_XYZ is accessed. The model data is not stored in a hash table. In this way, queries can take advantage of the fast access properties that are associated with analytic workspaces. Moreover, the use of analytic workspaces to provide a materialized view of relational tables is transparent to the user.

Although a persistent multidimensional database may be used to implement embodiments, a non-persistent multidimensional database may also be used in some embodiments. The non-persistent multidimensional database could be populated dynamically with data when a query, such as a query with a MODEL clause, is executed. If a large quantity of queries that include MODEL clauses are performed, a number of session analytic workspaces could be employed. In another embodiment, an analytic workspace may be maintained beyond a session.

If data in an analytic workspace is updated using a MODEL clause, the updated data in the analytic workspace may persist for the duration of a session, or across sessions. An additional feature that is found in an embodiment relates to the fact that unlike a hash table, an analytic workspace is capable of remembering updates. As such, a query including MODEL clause could be executed, and then update data in an analytic workspace. The updated data could then me accessed by a second MODEL clause that is executed. This feature is not available in relational database management systems.

Hardware Overview

The approach for using a multidimensional database as a surrogate for a hash table in the context of a relational query that are described herein may be implemented in a variety of ways and the invention is not limited to any particular implementation. The approach may be integrated into a computer system or a network device, or may be implemented as a stand-alone mechanism. Furthermore, the approach may be implemented in computer software, hardware, or a combination thereof.

Figure 4:
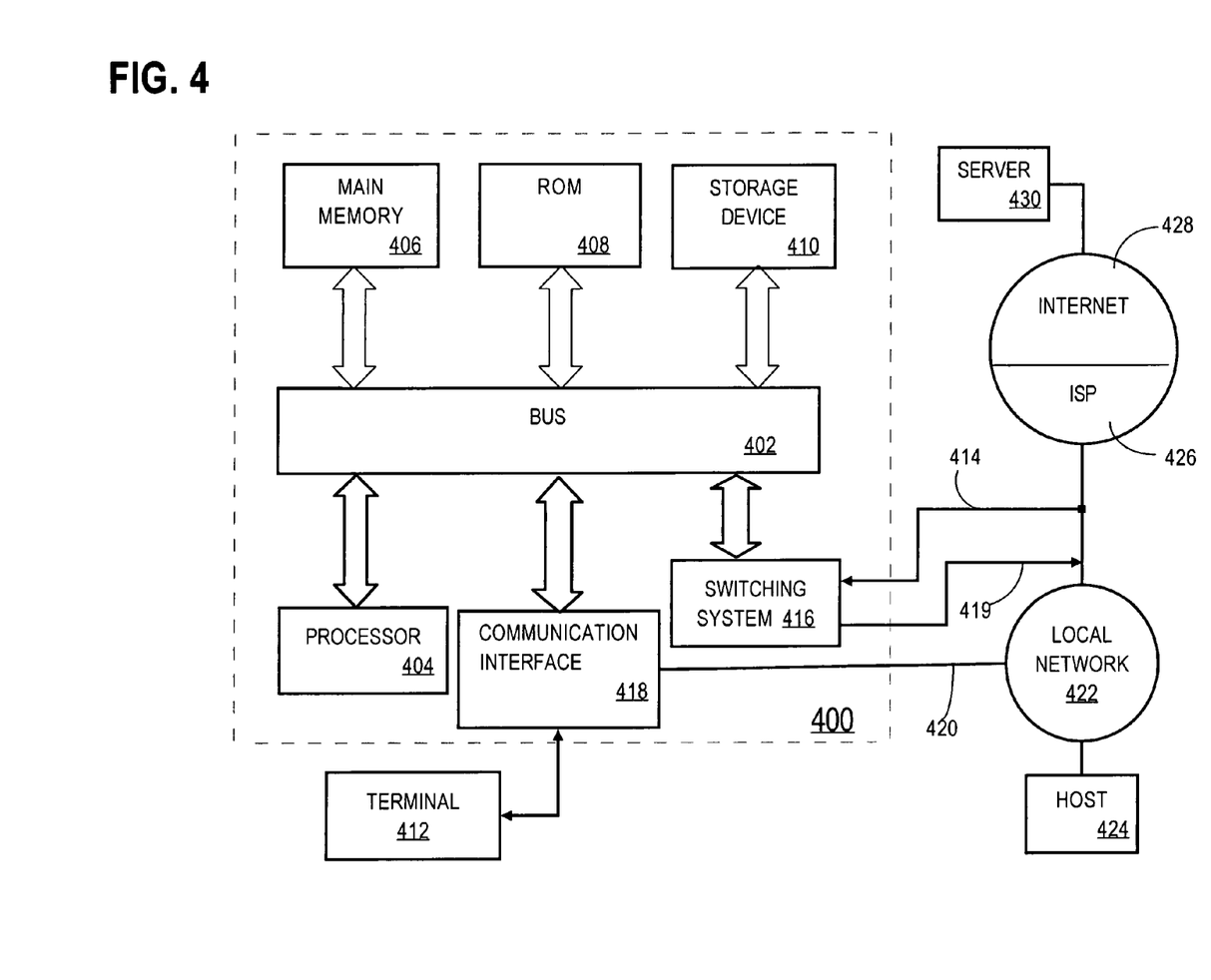
FIG. 4 is a block diagram depicting an embodiment of a system upon which embodiments of the disclosed approaches may be implemented.

FIG. 4 is a block diagram that depicts a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   processing a relational query that contains at least one clause;
      wherein said relational query references relational database structures to access relational data stored in one or more tables;
      wherein said at least one clause defines:
         (a) in terms of said relational data, a multidimensional array having one or more array dimensions and a measure by specifying:
            (a1) for each array dimension of said one or more array dimensions, a column of said relational database structures that holds dimension values of said each array dimension;
            (a2) a column of said relational database structures that holds measure values of said measure;
         (b) at least one formula specifying an operation to perform on said multidimensional array; and
      wherein processing said relational query comprises:
         determining whether said relational data has previously been loaded into an analytic workspace;
         when said relational data has not previously been loaded into an analytic workspace, then loading said relational data from said one or more tables into multidimensional structures of an analytic workspace to transform said relational data into multidimensional data;
         evaluating said at least one clause by accessing said multidimensional structures to compute a formula result for said formula;
         producing query results for said relational query based on the formula result for said formula; and
   wherein the method is performed by one or more computing devices.

2. The method of claim 1, wherein said at least one clause is a MODEL clause.

3. The method of claim 1, further comprising:
   when said relational data has not previously been loaded into an analytic workspace, creating the analytic workspace in response to execution of the relational query.

4. The method of claim 1, wherein said loading said relational data from said one or more tables into multidimensional structures of an analytic workspace to transform said relational data into multidimensional data is managed by a multidimensional engine; the method further comprising:

a step of performing at least one of aggregating said multidimensional data and performing a calculation on said multidimensional data to compute said formula, wherein said step of performing at least one of aggregating and performing a calculation is performed by said multidimensional engine prior to loading said analytic workspace.

5. The method of claim 1, wherein said step of evaluating is performed by a relational engine.

6. The method of claim 1, wherein said relational query is a first relational query and said first relational query causes an update of said multidimensional data in said analytic workspace, the method further comprising:

executing a second relational query that accesses multidimensional data that was updated by said first relational query.

7. The method of claim 1, wherein the analytic workspace serves as a surrogate for a hash table.

8. A non-transitory computer-readable medium carrying one or more sequences of instructions which, when executed by one or more processors, causes the one or more processors to perform:

processing a relational query that contains at least one clause;
wherein said relational query references relational database structures to access relational data stored in one or more tables;
wherein said at least one clause defines:
(a) in terms of said relational data, a multidimensional array having one or more array dimensions and a measure by specifying:
(a1) for each array dimension of said one or more array dimensions, a column of said relational database structures that holds dimension values of said each array dimension;
(a2) a column of said relational database structures that holds measure values of said measure;
(b) at least one formula specifying an operation to perform on said multidimensional array; and
wherein processing said relational query comprises:
determining whether said relational data has previously been loaded into an analytic workspace;
when said relational data has not previously been loaded into an analytic workspace, then loading said relational data from said one or more tables into multidimensional structures of an analytic workspace to transform said relational data into multidimensional data;
evaluating said at least one clause by accessing said multidimensional structures to compute a formula result for said formula;
producing query results for said relational query based on the formula result for said formula.

9. The computer-readable medium of claim 8, wherein said at least one clause is a MODEL clause.

10. The computer-readable medium of claim 8, wherein the instructions further cause the one or more processors to perform:

when said relational data has not previously been loaded into an analytic workspace, creating the analytic workspace in response to execution of the relational query.

11. The computer-readable medium of claim 8, wherein said loading said relational data from said one or more tables into multidimensional structures of an analytic workspace to transform said relational data into multidimensional data is managed by a multidimensional engine; the instructions further causing the one or more processors to perform:

a step of performing at least one of aggregating said multidimensional data and performing a calculation on said multidimensional data to compute said formula, wherein said step of performing at least one of aggregating and performing a calculation is performed by said multidimensional engine prior to loading said analytic workspace.

12. The computer-readable medium of claim 8, wherein said evaluating is performed by a relational engine.

13. The computer-readable medium of claim 8, wherein said relational query is a first relational query and said first relational query causes an update of said multidimensional data in said analytic workspace, the instructions further causing the one or more processors to perform:

executing a second relational query that accesses multidimensional data that was updated by said first relational query.

14. The computer-readable medium of claim 8, wherein the analytic workspace serves as a surrogate for a hash table.

15. A system for processing a relational query comprising:
one or more processors;
memory operatively coupled to said one or more processors;
an analytic workspace to store multidimensional data, said analytic workspace including multidimensional structures for accessing said multidimensional data, said analytic workspace including a dimension for said multidimensional data;
an interface to the analytic workspace configured to allow random access to said multidimensional data stored in said analytic workspace; and
a relational engine configured to process a relational query that contains at least one clause;
wherein said relational query references relational database structures to access relational data stored in one or more tables;
wherein said at least one clause defines:
(a) in terms of said relational data, a multidimensional array having one or more array dimensions and a measure by specifying:
(a1) for each array dimension of said one or more array dimensions, a column of said relational database structures that holds dimension values of said each array dimension;
(a2) a column of said relational database structures that holds measure values of said measure;
(b) at least one formula specifying an operation to perform on said multidimensional array; and
where processing said relational query comprises:
determining whether said relational data has previously been loaded into said analytic workspace;
when said relational data has not previously been loaded into said analytic workspace, then loading said relational data from said one or more tables into said analytic workspace to transform said relational data into multidimensional data.

16. The system of claim 15, further comprising:
a multidimensional engine configured to perform aggregations and calculations on said multidimensional data based on said operation specified in said formula.

17. The system of claim 15, wherein said analytic workspace is created prior to the processing of the relational query.

18. The system of claim 15, wherein said analytic workspace is created in response to processing of the relational query.

19. The system of claim 15, further comprising means for storing said multidimensional data in said analytic workspace.

* * * * *